United States Patent [19]

Purser

[11] Patent Number: 4,842,613
[45] Date of Patent: Jun. 27, 1989

[54] TECHNIQUE FOR PRINTING DISPERSE DYES ON GLASS OR CERAMIC SURFACES

[75] Inventor: Terence B. Purser, Greensboro, N.C.

[73] Assignees: Terence Brook Purser; John Howell, both of High Point, N.C.

[21] Appl. No.: 125,876

[22] Filed: Nov. 27, 1987

[51] Int. Cl.⁴ ............................................. D06P 1/16
[52] U.S. Cl. ........................................... 8/471; 8/523
[58] Field of Search ..................................... 8/471, 523

[56] References Cited

U.S. PATENT DOCUMENTS 2,971,864  2/1961  Speier ..................................... 8/523
4,173,672  11/1979 Mannheim ............................. 8/470
4,395,263  7/1983  Davis ..................................... 8/506

OTHER PUBLICATIONS

Derwent Abstracts, Abstract No. 78-23503A, "Printing Flat Goods With Sublimable Dye", German Patent DE 2642350, 3/23/78.

Primary Examiner—A. Lionel Clingman
Assistant Examiner—Christine A. Skane
Attorney, Agent, or Firm—Rhodes & Coats

[57] ABSTRACT

A non-metallic, inorganic surface, such as glass or ceramic is decorated by heat transfer printing a pattern of disperse dyes thereon. A silane primer is applied to the glass or ceramic surface to receive and bond thereto an organic polymeric resin. The disperse dyes are then heat transferred onto and retained by the polymeric resinous layer. Oxidation of the disperse dyes is prevented by applying a seal coat of a protective material such as lacquer, varnish, or clear resin. The sealant and/or polymeric resinous layer are further provided with an ultraviolet absorber. Frosting of the pattern of disperse dyes is achieved by mixing a flatting agent such as silica in the sealant.

13 Claims, 1 Drawing Sheet

TECHNIQUE FOR PRINTING DISPERSE DYES ON GLASS OR CERAMIC SURFACES

BACKGROUND AND SUMMARY OF THE PRESENT INVENTION

The present invention relates to a process for printing disperse dyes onto glass or ceramic surfaces, and more particularly to such a process which yields improved results from the standpoint of dye fastness and pattern flexibility.

Previously, the conventional technique for painting or decorating non-metallic, inorganic surfaces such as glass or ceramic surfaces was by screen printing. In a typical screen printing operation, a separate screen is made for each color to be applied. A first screen is brought into registry with the glass or ceramic surface and a first color painted thereon. A second, third, and fourth screen, if necessary, each representing different colors, is then brought into registry with the glass or ceramic surface and the additional colors painted or brushed thereon through the pattern in the screen. There are many disadvantages to such screen printing techniques. Each color must be applied individually, dried, and cured before the next color can be applied. Thus the time and cost factors become high. Secondly, it is difficult to register the plurality of screens in exactly the right position so that the colors do not overlap. As a result the waste factor may become enormous. The paints or dyes utilized in conjunction with screen printing are not transparent. Further half-tones cannot be achieved by screen printing and therefore true replicas of patterns or scenes are not possible.

In the textile industry, the problems associated with screen printing have been overcome, to some extent, by a process known as "heat-transfer printing" in which a carrier consisting usually of paper or aluminum foil is printed with sublimable dyes and temporarily affixed to the carrier by the use of binders. The carrier so printed is then laid with the printed side adjacent the fabrics to be printed, and is then heated under pressure to a temperature in the range of 160° to 220° C. on the unprinted side of the carrier to sublime the dyes onto the fabric.

The heat-transfer printing technique has been attempted on a wide variety of sheet-like articles such as wood, metals, glass, ceramics, and certain synthetic resins by providing such articles with a surface layer or coating of a thermoplastic resin which presumably adheres to the surface of the substrate and accepts the sublimable dyes. See German patent application DOS No. 2,642,350; French Pat. No. 2,230,794; and British Pat. No. 1,517,832. Similarly the surface of the article to be printed may be coated with a thermosetting resin (published European patent application No. 14,901) which receives the dyes. Characteristic of all of the above approaches is that the transfer of the dyes by sublimation onto the thermosetting or thermoplastic resin is effected by means of heat supplied or generated by an external source.

While the above described techniques temporarily result in a somewhat satisfactory product with the dyes affixed to the resinous layer, which in turn is deposited on the glass or ceramic surface, serious problems have been observed. First of all, the thermosetting and/or thermoplastic resin tends to release from nonmetallic, inorganic surfaces such as glass or ceramic in the presence of moisture such as would be present during washing, in bathrooms, or on items subjected to the outside elements. As the resinous coating peels away from the glass or ceramic surface, the decorative pattern vanishes. Further, disperse dyes tend to fade when subjected to sunlight. Also when the disperse dyes are applied to a resinous coating on glass or ceramic surfaces, a strange phenomenon is discovered in that the disperse dyes oxidize after a short period of time. When oxidized, the surface becomes distorted and a large percentage of the inks rise to the surface and spread. The inks can be readily wiped off and the decorative pattern is lost.

A glass or ceramic surface, on the other hand, when treated with the disperse dyes would be highly desirable if the problems discussed hereinabove could be overcome. Disperse dyes, as opposed to screen printing inks are transparent and give rise to various additional uses and unique aesthetic effects. Some examples of products resulting from disperse dyes utilized to decorate glass surfaces include mirrors with transparent images or decorations thereon; mirrors with frosted images; simulated stained glass windows; mirrors with a printed image between the glass and silver; glass which is printed on the reverse surface and frosted; and shower doors which could be treated with any number of decorative patterns not now available.

According to the present invention there is first provided a technique for printing and permanently affixing disperse dyes onto a glass or ceramic surface in such a manner that the printed pattern is transparent and withstands moisture. This is accomplished by treating the glass or ceramic surface with a silane primer coat which bites into and bonds to the glass or ceramic surface. When a clear thermoplastic or thermosetting resin is applied to the glass or ceramic surface either subsequent to or along with the silane primer, the resinous coating becomes bonded tightly to the glass or ceramic surface and resists peeling even in the presence of moisture. While most thermoplastic and thermosetting resins will provide acceptable results, the aliphatic urethanes, notably polyurethane, appear to be the preferred organic polymeric resins.

The transfer paper or foil with the disperse dyes affixed thereto according to conventional techniques is brought into contact with the glass or ceramic surface and heated (375° F. to 420° F.) under pressure from the reverse side to transfer the printed pattern onto the organic polymeric resin.

As noted hereinabove after a short period of time (less than 30 days) the disperse dyes begin to oxidize and the pattern lost or distorted if not treated with some type of protective coating. Therefore, a sealer composition, which may be either lacquer, varnish, or clear polymeric resins is applied to the printed pattern shortly (within 30 days) of the time the pattern is first printed onto the glass or ceramic surface to prevent the oxidation thereof.

Since the disperse dyes tend to fade in the presence of ultraviolet light, as from sunlight, in order to fix the dyes and prevent fading, there is provided an ultraviolet absorber either in the polymeric resin or in the sealant or in both.

A further, completely different decorative effect can be achieved by frosting the print pattern. Frosting is accomplished by mixing a flatting agent in the aforesaid sealer composition. Flatting agents are substances (such as silica) ground into minute particles, powders, or irregular shapes to disperse incident light rays so that a dull matte or non-glossy effect is produced. When mixed with the sealant a frost produces a unique and novel appearance in which the printed colored area of the glass or ceramic shows through the frosted portion.

It is therefore an object of the present invention to provide an improved process for printing and affixing non-metallic, inorganic surfaces such as glass or ceramic with disperse dyes.

It is another object of the present invention to provide a process of the type described by treating the glass or ceramic surface with a bite chemical which causes the organic polymeric resin upon which the disperse dyes are deposited to firmly and permanently adhere to the glass or ceramic surface even in the presence of moisture.

It is yet another object of the present invention to provide a process of the type described in which the colors do not fade.

Another object of the present invention is to provide a process of the type described in which the disperse dyes do not oxidize.

Yet another object of the present invention is to provide a process for applying a frosted disperse dye finish to a glass or ceramic surface by the use of a flatting agent.

Other objects and a fuller understanding of the invention will become apparent from reading the following detailed description of the preferred embodiment along with the accompanying drawings in which:

FIG. 1 is a frontal view of a glass or ceramic surface treated with a decorative pattern according to the present invention; and FIG. 2 is a sectional view taken substantially along lines 2—2 in FIG. 1.

DETAILED DESCRIPTION OF A PREFERRED EMBODIMENT

Figure 1:
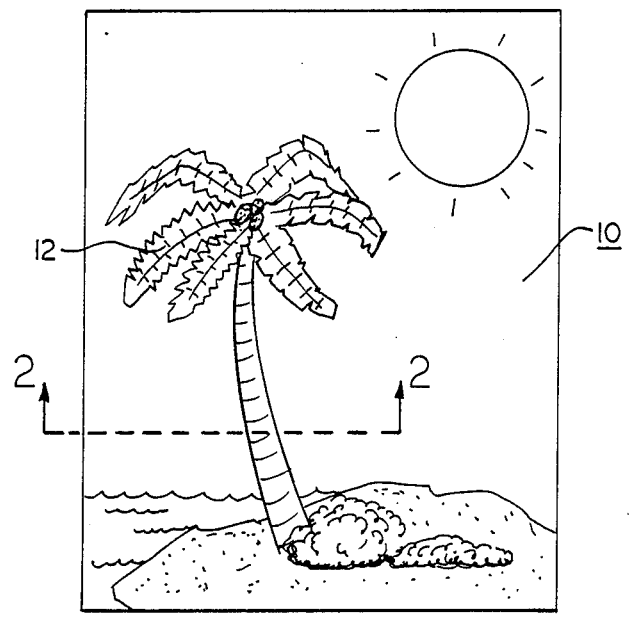
Figure 2:
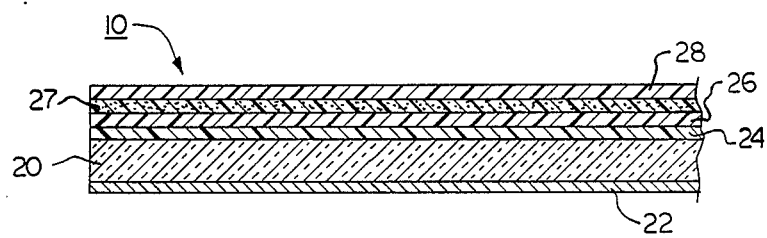

Turning now to the drawings, there is illustrated, by way of example, in FIGS. 1 and 2 a glass mirror 10 printed with disperse dyes in accordance with the technique of the present invention.

In general the printed pattern or image 12 is applied by the heat transfer of the disperse dyes from a paper or aluminum foil carrier onto the glass surface 10 or onto a ceramic surface. The pattern 12 may cover a portion of the glass or ceramic surface 10 as illustrated in FIG. 1, or alternatively it may extend across the entire surface, as in the case of simulated stained glass windows.

Turning now to FIG. 2, there is illustrated the mirror 10 comprising a glass member 20 with a silver or silver nitrate coating 22 on the back or reverse side thereof. In accordance with the present invention there is applied a layer 24 of the bite chemical, which is silane. The silane should be selected as to be compatible with the organic polymeric resin selected. The preferred silane is one of the organofunctional silanes such as polyurethane silane (sold, for example, as Union Carbide silanes Nos. A189 and Y9492). The silane is diluted to a liquid composition preferably containing substantially 5% silane, 90% isopropyl alcohol, and 5% water. The silane coating 24 may be screened onto the glass in the area of the pattern 12 alone, or may be applied, as by spraying or dipping in a bath, across the entire surface 10 of the glass or ceramic, depending upon the type of pattern to be applied. Alternatively, the silane may be incorporated into the organic polymeric resin (approximately 1-4% silane composition by weight) and applied therewith. It has been noted that the silanols which exist on the glass surface react with the silane bite chemical to form a chemical bridge that tightly adheres to the glass surface. On the other side of the silane coating, the organofunctional portion of the silane reacts with the organic polymeric resins of coating 26. As a result, the organic polymeric resin, whether it be thermoplastic or thermosetting tightly adheres to the glass or ceramic surface and does not tend to release, even in the presence of moisture. Where applied separately from the organic polymeric resin, the silane is cured before application of the resin. A clear organic polymeric resin coating 26 is applied over or along with the silane primer coat 24. As mentioned hereinabove, the organic polymeric resin may be thermoplastic or thermosetting; however, the thermoplastic resins tend to be more flexible and less brittle. Further, thermosetting resins need a catalyst and generally dry very quickly which tend to clog up screens, when used, and must be cured before the printing operation. It has been found that the aliphatic urethanes appear to be the preferred thermoplastic resin. They are moisture cured and are ready for printing within 12-24 hours. Somewhat less preferred polymers include the aromatic urethanes, polyacrylonitrile, polyamides, polyacrylates, polyesters, epoxy, amino resins, acrylic copolymers, or any other polymeric base chemical that is clear and receptive to the heat transfer printing process. The chosen organic polymeric resin may be applied by spraying, roller coating, painting, screening, or in accordance with other conventional techniques.

Following the application of the clear organic polymeric resin, the resin must be cured. In the case of thermoplastic resins, the curing takes place merely by allowing the treated articles to dry in the air. In the case of aliphatic urethanes total curing takes place in approximately six to seven days and the dyes are most secure; however, the printing step can take place in the range of 12-24 hours. This time can be accelerated somewhat by adding a catalyst, e.g. zinc octoate, 8% by weight of resin solids. The other resins listed above, on the other hand, must be heat cured by subjecting the article to some type of oven or kiln. Printing may occur either before or after curing so long as the organic resin is not tacky.

Following curing of the clear organic polymeric resin, the heat transfer printing operation is conducted according to well known techniques. Generally, the carrier (paper or foil) which carries the disperse dyes in the selected pattern is placed in engagement with the glass or ceramic surface 10. The heat transfer dyeing step is then effected by subjecting the carrier to heat and pressure in the range of 375° F. to 420° F. and 60-80 per square inch pounds respectively.

When subjected to such a heat and pressure treatment, the dyes on the carrier turn into a gas and are then transferred from the paper or foil onto the resinous coated glass or ceramic. When the dyes cool they return to the solid state and a transparent printed image 27 is created on the resinous coating. One of the characteristics of the disperse dyes is that they are transparent when applied to the clear polymeric resins. Therefore, the printed display can be either seen through in the case of clear glass or an image will reflect through in the case of a mirror. Further, the images and pictures produced by the heat transfer printing of disperse dyes can reproduce an exact replica of any photograph, including half tones and sharp images. This is not possible by any other printing method currently being used on glass or ceramic.

During experimentation and testing of the technique, it has been noted that the disperse dyes applied in the above described process tend to oxide after a short period of time (less than thirty days in the case of aliphatic urethanes). When oxidized, the surface becomes distorted and the inks begin to rise to the surface from whence they may be easily removed by washing, wiping, or the like. The image is then destroyed and the article becomes totally useless. In order to prevent the oxidation, there is provided a seal coating 28 which prevents contact of the disperse dye by air. The seal coating 28 may be any clear chemical that, when applied, is impervious to air and is compatible with the base chemical and the dye. Krinkle coatings provide both a sealant and a unique aesthetic effect. For example, such sealants as clear lacquer, clear varnish, and clear polymeric resins will satisfactorily seal the surface of the disperse dye and prevent such oxidation.

It has also been noted that the disperse dyes are subject to distortion or fading as a result of being subjected to sunlight. This may occur in either of two ways. The ultraviolet rays may break down the bonds of the polymeric resin and/or may excite and cause the free radicals in the resin to attack the dyes or other chemicals. Thus both an ultraviolet absorber and a light stabilizer are contemplated. Examples of light stabilizers include sterically hindered amines such as Tinuvin ® 292, the registered trademark of Ciba-Giegy. Examples of ultraviolet absorbers include the benzotriazole class of UV absorbers (Tinuvin ® 1130, also the registered trademark of Ciba-Giegy). In use, the sterically hindered amine should be used in concentrations of 1-2% by weight of the resin solids and the benzotriazole class of stabilizers should be used in the range of 3-5% by weight of the resin solids. The UV absorber and/or light stabilizer may be incorporated into the organic polymeric resin or into the seal coating, or into both. In the latter case, it has been noted that the light fastness is increased up to 500%.

A frost effect is achieved by incorporating a flatting agent into the seal coat 28. A flatting agent is a substance such as heavy metal soaps, finely divided silica, diatomaceous earth materials ground into minute particles or powder of irregular shape and used in coatings to disperse instant light rays so that a dull or flat effect is produced. By incorporating the flatting agent into the seal coat and applying the seal coat over the printed pattern by spraying, screening, printing, or roller coating, the printed area shows through the frost which provides a unique and novel appearance. A preferred mixture of flatting agent includes one pound of silica powder added to one gallon of a zylene solvent. The silica should be added slowly into the zylene and continuously stirred until the powder is completely dispersed. By adding 10-50% (30-50% is preferred) of the flatting agent into the sealant, the frost chemical is then created.

The silane primer, as previously discussed, serves to permanently bond the printed pattern to the glass or ceramic surface even in the presence of moisture. The seal coating prevents oxidation of the printed pattern. The ultraviolet absorbers stabilize the light fastness of the printed pattern. The frost coating provides a unique ornamental appearance to the printed pattern. All of these unique features, both individually and collectively, provide a resultant disperse dye printed pattern on glass and ceramic surfaces which heretofore has not been attainable. The fact that the transparent pattern may now be made permanent on articles which are subjected to moisture provides for a wide variety of new uses for the glass and ceramic articles. Examples include mirrors with a transparent image thereon providing for reflection of light rays through the transparent image; mirrors for use in bathrooms may be treated with a frosted image. The print image may be utilized either on the outer surface of the mirror or it may be provided between the glass and the silver coating.

When the image is applied between the glass and the reflective (silver) coating, it has been noted that a protective coating generally should be applied over the image to prevent a "mist" effect. Protective coatings which are satisfactory include any lacquer, varnish or clear resin or paint which is compatible to the silvering process or other process for applying a reflective coating. For example a clear epoxy resin has been shown to produce excellent results. Where clear epoxy is the clear organic polymeric resin, it is not necessary to apply a protective coating thereof, because the resin is already compatible with the silvering process. Where the organic polymeric resin is hydrophobic in nature, the silvering solution does not always spread evenly and efficiently and wet out the surface of the resin. In such cases it is necessary to treat the resinous coating with a sensitizer to make the surface compatible with the silvering process. Such sensitizing chemicals include silicon based surfactants such as dimethicone copolyol or standard ethylene oxide type surfactants. On clear glass the image may be printed on the reverse side of the glass and frosted which provides for even additional unique effects.

The production of simulated stained glass is now made possible because the printed image may be utilized on exterior surfaces, such as windows. In the forming of stained glass windows, the multi-colored disperse dye pattern is first placed on the paper or foil carrier. The colors are then transferred onto a clear glass substrate utilizing the teachings of the invention. As a result, there will be a glass having the appearance of different colored stained glass areas. To make the article even more authentic, lead may be applied along the borders between the different colors. Such a result is quite authentic looking, and, because of the silane coating will remain permanent, even though subjected to rain, snow, wind, and other elements.

While a preferred embodiment of the present invention has been shown and described hereinabove, it is apparent that various changes and modifications might be made without departing from the scope of the invention which is set forth in the accompanying claims.

What is claimed is:

1. The process for applying a frosted disperse dye finish to a glass or ceramic surface comprising the steps of:
    (a) applying a coating of an organic polymeric resin selected from the group containing thermoplastic and thermosetting resins;
    (b) applying a carrier sheet containing sublimable or disperse dyes thereon onto the organic polymeric resinous coating;
    (c) transferring said disperse dyes into the polymeric resinous coating by the application of heat; and
    (d) applying a protective coating formed of a material from the group containing lacquer, varnish, and polymeric resins, and incorporating a flatting agent in said protective coating, said flatting agent comprising a material selected from the group containing heavy metal soaps, finely divided silica, and diatomaceous earth whereby a frosted coating is formed across the printed image.

2. The process according to claim 1 wherein an ultraviolet absorber and a light stabilizer are incorporated in at least one of said organic polymeric resin coating and said protective seal coating, said ultraviolet absorber being any ultraviolet absorber compatible with said organic polymeric resin and said light stabilizer is a sterically hindered amine.

3. The process according to claim 1 wherein said coating of organic polymeric resin is applied to selective areas of the glass or ceramic surface.

4. The process according to claim 1 wherein said organic polymeric resin is an aliphatic urethane.

5. The process according to claim 1 wherein the organic polymeric resin is polyurethane.

6. Process for applying a disperse dye printed pattern in a mirror between the glass and the silver coating comprising the steps of:
  (a) applying an organic polymeric resin coating selected from the group containing thermoplastic and thermosetting resins onto one surface of the glass;
  (b) applying a printed image to said organic polymeric resinous coating by applying a carrier sheet containing sublimable or disperse dyes thereon;
  (c) heating said disperse dyes on said carrier sheet under pressure to transfer the dyes onto said resin; and
  (d) applying a reflective coating over the printed image to seal the image between the glass and the reflective coating.

7. The process according to claim 6, including incorporating an ultraviolet absorber and a light stabilizer into said organic polymeric resin, said ultraviolet absorber being any ultraviolet absorber compatible with said organic polymeric resin and said light stabilizer being a sterically hindered amine.

8. The process according to claim 6 wherein there is additionally applied to the organic resinous coating a sensitizer to make the resin compatible with the application of the silver coating, said sensitizer being surfactants selected from the group containing silicon based surfactants and ethylene oxide type surfactants.

9. The process according to claim 6 wherein the surface of said glass is treated with a silane primer to improve adherence of said organic polymeric resin.

10. The process according to claim 6 wherein a silane primer is mixed with and applied with said organic polymeric resin to improve adherence of said resin to said glass.

11. The process according to claim 6 wherein said organic polymeric resin includes the aliphatic urethanes.

12. The process according to claim 6 wherein said organic polymeric resin is polyurethane.

13. The process according to claim 6 wherein a seal coating is applied over said printed image, said seal coating being compatible with said reflective coating and being selected from the group containing lacquer, varnish, and polymeric resins.

* * * * *